United States Patent
Hamilton et al.

(10) Patent No.: US 9,140,577 B2
(45) Date of Patent: Sep. 22, 2015

(54) UTILITY DEVICE INTERFACE

(71) Applicant: Neptune Technology Group Inc., Tallassee, AL (US)

(72) Inventors: David Hamilton, Auburn, AL (US); William J Brennan, Montgomery, AL (US); Michael A Wilson, Tallasse, AL (US)

(*) Notice: Subject to any disclaimer, the term of this patent is extended or adjusted under 35 U.S.C. 154(b) by 0 days.

(21) Appl. No.: 14/213,815

(22) Filed: Mar. 14, 2014

(65) Prior Publication Data
US 2014/0313050 A1    Oct. 23, 2014

Related U.S. Application Data

(60) Provisional application No. 61/798,373, filed on Mar. 15, 2013.

(51) Int. Cl.
*G06F 12/14* (2006.01)
*G01D 4/00* (2006.01)
(Continued)

(52) U.S. Cl.
CPC ............ *G01D 4/002* (2013.01); *G01D 4/00* (2013.01); *G06F 12/145* (2013.01); *G06F 12/14* (2013.01);
(Continued)

(58) Field of Classification Search
CPC ....... G01D 4/002; G01D 4/004; G01D 4/006; Y04S 20/32; Y04S 20/46; Y04S 20/50; Y04S 20/322; Y02B 90/241; Y02B 90/242; Y02B 90/243; H04Q 2209/60; H04W 4/008; G06F 12/14; G06F 12/145; G06F 21/62
USPC ............ 340/870.02; 702/61, 62; 705/63, 412
See application file for complete search history.

(56) References Cited

U.S. PATENT DOCUMENTS 3,754,250 A    8/1973    Bruner
4,782,341 A    11/1988    Gray
(Continued)

FOREIGN PATENT DOCUMENTS

CA    2525962    4/2007
EP    0305630    3/1989

OTHER PUBLICATIONS

Kurze, Volker "International Search Report and Written Opinion—PCT/US2014/029131" European Patent Office; Jun. 2, 2014; pp. 1-10.
(Continued)

*Primary Examiner* — Ariel Balaoing
*Assistant Examiner* — Benyam Haile
(74) *Attorney, Agent, or Firm* — Paul Sykes; Nicholas Landau; Bradley Arant Boult Cummings LLP

(57) ABSTRACT

A meter interface unit (MIU) is provided for a utility meter that uses RFID technology as both a source of backup power and as a means of transmitting utility usage data. Usage data is stored in non-volatile memory that will persist even if the main power source of the MIU is lost. Because an RFID generates electric current when it receives an electromagnetic signal from an interrogator, the RFID can provide power to the memory, read the usage data from the memory, and wirelessly transmit the usage data back to the interrogator without any other source of power. This can prevent data loss when the MIU runs out of power; for example, when its battery is expended. RFID technology can also provide many other benefits and uses when coupled with an MIU, in addition to serving as backup power and communication.

35 Claims, 1 Drawing Sheet

(51) Int. Cl.
   *G06F 21/62* (2013.01)
   *G06K 19/07* (2006.01)
   *G06K 19/077* (2006.01)

(52) U.S. Cl.
   CPC ............ *G06F 21/62* (2013.01); *G06K 19/0723* (2013.01); *G06K 19/07749* (2013.01); *H04Q 2209/47* (2013.01); *Y02B 90/248* (2013.01); *Y04S 20/52* (2013.01)

(56) References Cited

U.S. PATENT DOCUMENTS

| | | | | |
|---|---|---|---|---|
| 5,517,194 | A * | 5/1996 | Carroll et al. | 340/10.34 |
| 7,126,493 | B2 * | 10/2006 | Junker et al. | 340/870.02 |
| 8,188,883 | B2 * | 5/2012 | Martin | 340/870.02 |
| 2007/0194945 | A1 * | 8/2007 | Atkinson | 340/825.72 |
| 2008/0030325 | A1 * | 2/2008 | Fries | 340/539.32 |
| 2009/0322884 | A1 | 12/2009 | Bolick | |
| 2010/0003918 | A1 * | 1/2010 | Malik | 455/41.2 |

OTHER PUBLICATIONS

"Installation Instructions Sensus RadioRead Meter Transceiver Units (MXU) Model 500" AMR-974-R3; pp. 1-2.

"ProRead/E-Coder Encoder Warranty Statement" ARB Utility Management Systems; Neptune Technology Group Inc.; pp. 1-2.

"ProRead Register Product Sheet" ARB Utility Management Systems; Neptune Technology Group; Copyright 2012; pp. 1-2.

"ProRead Model PRG-100 Field Programmer User's Guide" Neptune Technology Group Inc.; Copyright 2002; pp. 1-32.

"Neptune ProRead ARB" ProRead 1/94; Schlumberger Industries Water Division Copyright 1994; Systems; pp. 1-2.

"ProRead Auto Detect Register" PS ProRead 12.01; Copyright 2001, Neptune Technology Group Inc.; pp. 1-2.

"Field Programmer User's Manual" UM Programmer 04.09; Copyright 2009, Neptune Technology Group Inc.; pp. 1-80.

"Encoder Quick Install Guide" Q1 Encoder 10.06; Copyright 2003-2006, Neptune Technology Group Inc.; pp. 1-12.

"Absolute Encoder Register Specifications" Spec Absolute Encoder Register 03.15; Copyright 2015, Neptune Technology Group Inc.; pp. 1-3.

"Installation Instructions Sensus RadioRead Meter Transceiver Units (MXU) Model 500" AMR-974-R3; prior to Jan. 12, 2000; pp. 1-2.

"ICE Technical Report—The advanced Invensys Intelligent Communications Encoder Register for water and gas meters" AMR-300; Invensys Metering Systems; prior to 2004; pp. 1-18.

* cited by examiner

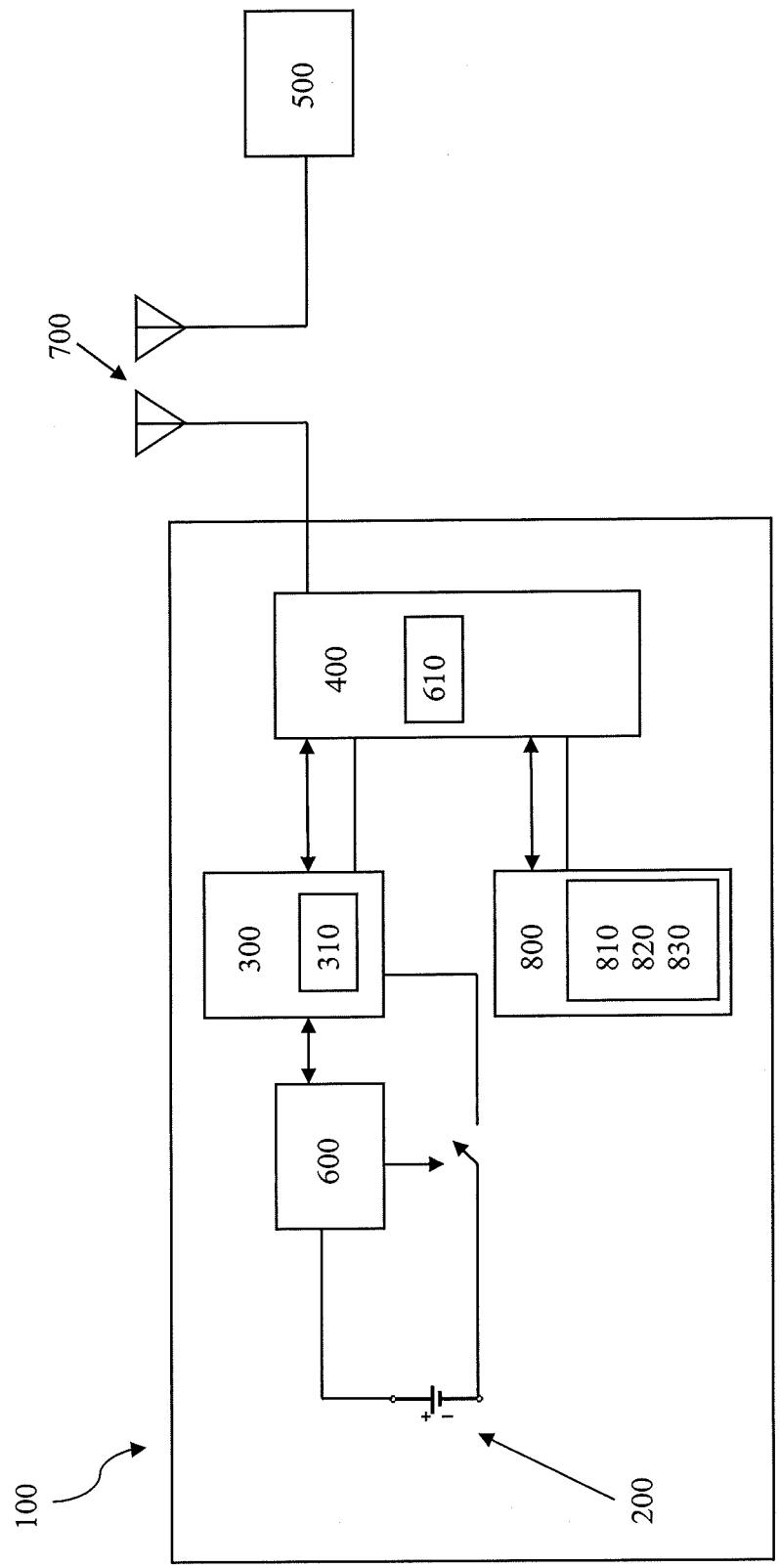

UTILITY DEVICE INTERFACE

CROSS-REFERENCE TO RELATED APPLICATIONS

This application cites under 35 U.S.C. §119(e) the benefit of the filing date of U.S. Provisional Patent Application No. 61/798,373, filed Mar. 15, 2013, which is currently pending, and which is incorporated herein by reference in its entirety.

BACKGROUND

A. Field of the Disclosure

The invention relates generally to automatic utility meter systems. More specifically, the invention relates to an RFID-enabled utility device interface unit configured to receive measurements from a utility meter.

B. Background

Meters that measure utility usage are widely used to keep track of the consumption of an end user. For example, utility companies that supply water to their customers typically charge for their product based on usage. Usage of water is typically measured by a meter that is installed for each individual customer on their respective water supply line. Traditionally, utility company employees periodically (usually monthly) manually collect readings from meters. These readings are usually cumulative, so the amount of usage for the present period is calculated by subtracting the reading from the previous period. Once the usage is calculated, the customer is billed for that amount of water used during that period.

Manually reading usage meters is labor intensive, time consuming, expensive, and subject to human error, especially for residential customers because each meter monitors relatively little usage as compared with larger, commercial customers. As a result, meters combined with electronics have been used to allow for quicker, more efficient, and more accurate collection of usage data along with other pertinent information such as leak information or reverse flow detection. The electronic portion is referred to as a "meter interface unit" (MIU). The meter may still measure usage by monitoring flow through a conventional, mechanical meter. The usage readings are stored electronically by the MIU and then transmitted via radio signals to a local transmitter/receiver (transceiver) operated by the utility.

The most common types of transceivers for this purpose are mobile transceivers and fixed networks. Mobile transceivers are generally handheld or vehicle mounted. A utility employee drives or walks within the transmission range of the meter and the meter data is received and stored. The use of mobile transceivers has the advantage of bringing the transceiver close to the meter, therefore allowing the MIU to broadcast using less energy; however, transporting the transceiver from place to place is laborious. Fixed networks have the advantage of saving the cost and labor of bringing the transceiver close to the MIU, but they require that the MIU transmit its data using more energy so it can reach a distant transceiver.

The MIU often cannot be practically connected to the power grid, so it must rely on an alternative source of power, such as a battery. Batteries of course hold only a limited amount of power, and when depleted the battery must be replaced or recharged. Replacing and recharging batteries has not yet been automated, and requires human labor. If batteries must be replaced, the cost of replacement batteries can be significant for the utility district in the aggregate. The growing popularity of fixed networks to read meters means that MIUs must transmit using more power, reducing battery life. When the battery is expended, the MIU cannot communicate with the transceiver and usage data is lost. Loss of power of course is not unique to batteries, and may occur even in situations in which the MIU receives power from the grid.

Consequently there is a need in the art for technologies to allow data to be safely stored and recovered from an MIU without the use of a separate battery power source.

SUMMARY

The following presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

The need described above, as well as others, has been solved by the inventor by providing a radiofrequency identification device (RFID)-enabled MIU configured to receive measurements from a utility meter. The RFID can be used to provide power to the MIU when the MIU's main power source (such as a battery) has failed. When used in conjunction with non-volatile memory, the device is able to save usage data to the non-volatile memory to prevent loss of data in case of loss of power, and transmit the usage data when the RFID is interrogated. As a result, loss of power will no longer cause data loss and preclude data transmission by the MIU. Some embodiments of the MIU could allow setting and configuration data to be read during installation or servicing without powering up the MIU.

A general embodiment of the RFID-enabled MIU comprises: a main power source; a memory storage device comprising non-volatile memory connected to receive power from the main power source, and configured to periodically record a measurement from the utility meter in the non-volatile memory when powered by the main power source; and an RFID connected to the memory storage device to read the memory storage device and to provide radiofrequency induction power to the memory storage device, configured to provide the radiofrequency induction power to the memory storage device in response to a signal from an interrogator, and configured to transmit the measurement that is recorded on the memory storage device in response to a signal from the interrogator.

A process is also provided for gathering utility usage data from an RFID-enabled meter interface unit. In a general embodiment, the process comprises recording a measurement from a utility meter on a memory storage device comprising non-volatile media while the memory storage device is powered by a main power source interrogating an RFID, the RFID connected to the memory storage device to read and transmit the measurement from the memory storage device and to provide radiofrequency induction power to the memory storage device; wherein, if the main power source is unavailable, said interrogation causes the RFID to power the memory storage device by radiofrequency induction, read the measurement from the memory storage device, and transmit the measurement to the interrogator.

BRIEF DESCRIPTION OF THE DRAWINGS

FIG. 1. This FIGURE illustrates an embodiment of the unit schematically.

DETAILED DESCRIPTION

A. Definitions

With reference to the use of the word(s) "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and/or the following claims.

The term "about" as used herein refers to a value that may vary within the range of expected error inherent in typical measurement techniques known in the art.

The term "storage device" as used herein refers to a machine-readable data storage device that retains data that can be read by mechanical, optical, or electronic means, for example by a processor. Such devices are sometimes referred to as "memory," although as used herein a machine-readable data storage device cannot comprise a human mind in whole or in part, including human memory. A storage device may be classified as primary, secondary, tertiary, or off-line storage. Examples of a storage device that is primary storage include the register of a central processing unit, the cache of a central processing unit, and random-access memory (RAM) that is accessible to a central processing unit via a memory bus (generally comprising an address bus and a data bus). Primary storage is generally volatile memory, which has the advantage of being rapidly accessible. A storage device that is secondary storage is not directly accessible to the central processing unit, but is accessible to the central processing unit via an input/output channel. Examples of a storage device that is secondary storage include a mass storage device, such as a magnetic hard disk, an optical disk, a drum drive, flash memory, a floppy disk, a magnetic tape, an optical tape, a paper tape, and a plurality of punch cards. A storage device that is tertiary storage is not connected to the central processing unit until it is needed, generally accessed robotically. Examples of a storage device that is tertiary storage may be any storage device that is suitable for secondary storage, but configured such that it is not constantly connected to the central processing unit. A storage device that is off-line storage is not connected to the central processing unit, and does not become so connected without human intervention. Examples of a storage device that is off-line storage may be any storage device that is suitable for secondary storage, but configured such that it is not constantly connected to the central processing unit, and does not become so connected without human intervention. Secondary, tertiary, and off-line storage are generally non-volatile, which has the advantage of requiring no source of electrical current to maintain the recorded information. A storage device cannot be construed to be a mere signal, although information may be communicated to and from a storage device via a signal.

The term "processor" or "central processing unit" (CPU) as used herein, refers to a software execution device capable of executing a sequence of instructions ("program"). The CPU comprises an arithmetic logic unit, and may further comprise one or both of a register and cache memory.

The term "microprocessor" refers to a CPU on at least one integrated circuit. Modern microprocessors often comprise one integrated circuit.

The term "computing device" refers to a CPU, a memory storage device, and a bus connected to exchange information between the CPU and the memory storage device. The CPU may comprise one or both of a register and a cache. Additional peripherals may be present.

B. RFID-Enabled Utility Meter Interface

A general embodiment of the RFID-enabled MIU 100 comprises a main power source 200; a memory storage device 300 comprising non-volatile memory connected to receive power from the main power source 200, and configured to periodically record a measurement from the utility meter in the non-volatile memory when powered by the main power source 200; and an RFID 400 connected to the memory storage device 300 to read the memory storage device 300 and to provide radiofrequency induction power to the memory storage device 300, configured such that the RFID 400 provides the radiofrequency induction power to the memory storage device 300 in response to a signal from an interrogator 500, and configured to transmit the measurement that is recorded on the memory storage device 300 in response to a signal from the interrogator 500.

The main power source 200 may be any suitable power source; in some embodiments the power source will not be radiofrequency-induced power. The "power source" in this context will be a source of electrical current. Many such sources are known in the art. The power source may be a local power grid, which has the advantages of excellent reliability, unlimited lifespan, and never needs replacement. The power source may also be a battery 210, which has the advantages of low voltage (requiring no transformer between the power source and the electronic components of the MIU 100), and availability in places where a power grid is not available. The power source may also be a local generator, for example a photoelectric generator, a fuel cell, an internal combustion generator, and a wind turbine. Such local generation has the advantage of being independent from a power grid. Solar cells and wind turbines have the further advantage of producing small amounts of power inexhaustibly (barring mechanical breakdown), and can provide power with enhanced consistency if used in conjunction with a rechargeable battery 210.

Radiofrequency induction occurs when an alternating electromagnetic field is encountered by a conducting coil, which generates an electrical current in the coil. Induction will occur over a wide range of frequencies, depending on the conductive material used in the coil (which is sometimes called the antenna 700). In order to avoid interfering with other uses of the electromagnetic spectrum, frequencies of 5.875 GHz and below are generally used for radiofrequency induction (particularly in the case of RFID applications).

The memory storage device 300 contains non-volatile media for storing information. Such non-volatile media could conceivably include any known in the art, such as magnetic-core memory, mask ROM, programmable ROM, EPROM, flash memory, ferroelectric RAM, magnetoresistive RAM, tape, magnetic disk, optical disk, and magneto-optical disk. Some embodiments of the device comprise electronically addressed non-volatile memory, which has the advantage of consuming less power to access than mechanically addressed non-volatile memory (for example, ROM, flash memory, ferroelectric RAM, and magnetoresistive RAM). In a specific embodiment the memory storage device 300 is a flash memory device.

The memory storage device 300 is configured to periodically record a measurement from the utility meter when it is powered by the main power source 200. For example, in a water meter the memory storage device 300 may be configured to record the current usage value from the meter periodically when the main power source 200 is providing power. The current usage value would be stored in non-volatile memory, and would persist even in the event of loss of power. The recording may be made at regular intervals, such as once per month, once per week, once per day, once per hour, etc. In a specific embodiment the recording is made once per hour. In some embodiments of the unit 100 the recording is made when a signal is received from the utility. The signal may be, for example, an interrogation signal from an RFID interrogator 500 or a query signal from a fixed network.

In further embodiments of the unit 100 the memory storage device 300 will record a measurement only when powered by the main power source 200. Should the main power source 200 become unavailable, the measurement will not be recorded, even if the unit 100 is otherwise programmed to record a measurement at that time. In still further embodiments, a measurement will be recorded when the main power source 200 is not available, if radiofrequency induction power becomes available. For example, the unit 100 may be designed to wake up upon interrogation of the RFID 400, power up the memory storage device 300 using induction power, and record a measurement from the meter.

The unit 100 comprises an RFID 400. The RFID 400 is of the "passive tag" type, although there may be a battery assist. Such passive tags do not transmit unless a signal is received by an interrogator 500. In the absence of auxiliary power (such as a battery assist system) the RFID 400 uses the power provided by radiofrequency induction from the interrogator signal to send an answering signal to the interrogator 500. Some of this power may be channeled to other purposes, such as providing power to the memory storage device 300. In the presence of auxiliary power, the passive tag will not transmit until interrogated, at which point the auxiliary power system will "wake up" and provide power to the RFID 400 and potentially other systems in the unit 100.

The RFID 400 is connected to the memory storage device 300 to transmit power to the memory storage device 300 and to read the memory storage device 300. The RFID 400 is configured to divert at least some of the radiofrequency induction power to the memory storage device 300, such that an onboard microprocessor may read the measurement that is recorded on it. The microprocessor is also configured to transmit the measurement once it has been read from the memory storage device 300.

If the RFID 400 has an auxiliary power source, the microprocessor may be configured to wake up the auxiliary power source when interrogated. The data storage device 300 may then be powered by the auxiliary power source. In such embodiments of the unit 100 the auxiliary power source is separate from the main power source 200.

Regardless of whether an auxiliary power source is present, the measurement can be read and transmitted even if the main power source 200 has been lost.

The MIU 100 may comprise a computing device 600 in addition to the onboard microprocessor. The computing device 600 may, for example, control the memory storage device 300. The computing device 600 may be the MIU 100 device controller. Alternatively the onboard microprocessor may control the memory storage device 300. In a specific embodiment the memory storage device 300 may be controlled and read by either the onboard processor or the computing device 600. In such an embodiment the memory storage device 300 may advantageously be a dual-port memory storage device 300.

The computing device 600 may be configured to receive measurements from the meter, write to the data storage device 300, read to the data storage device 300, transmit information via a radio signal, and/or receive information via a radio signal. The computing device 600 may be configured to process data received by any of the foregoing means. The computing device 600 may be configured or programmed to designate certain memory addresses 310 on the memory storage device 300 as read-only, to re-designate such addresses 310 as writable, or both.

The utility meter may be of any type, such as an electricity meter, a water meter, a gas meter, or another type of fluid meter. Some embodiments of the unit 100 are configured to receive measurements from a fluid meter, such as a gas meter or a water meter. Some embodiments of the unit 100 are configured to read a meter than is not an electricity meter; electricity meters are unusual among utility meters, as they have ready access to electrical power. MIUs are known in the art for all types of utility meters.

The RFID 400 may comprise an antenna 700. Some embodiments of the antenna 700 have a resonant frequency of up to about 5.875 GHz; further embodiments of the antenna 700 have a resonant frequency of about 450-470 MHz.

The unit 100 may also be configured to store and provide information in addition to the measurement. In such configurations, certain memory addresses 310 may be designated as write-only under certain conditions.

In some embodiments of the unit 100, the memory storage device 300 comprises a plurality of memory addresses 310, and wherein the RFID 400 is configured to receive a signal from the interrogator 500 that designates a memory address as write-protected. Information stored at the write-protected address cannot be overwritten until the address is re-designated as writable. In further embodiments of the unit 100 the RFID 400 is configured to receive a signal from the interrogator 500 that designates a memory address as write-protected against the recordation of any data not transmitted by an interrogator 500. In such embodiments the interrogator 500 has authority to overwrite the information at the address, but the unit 100 cannot overwrite the information at the address absent instructions from the interrogator 500. In further embodiments of the unit 100, the RFID 400 is configured to receive a signal from the interrogator 500 that designates a memory address as write-protected against the recordation of any data not transmitted by an interrogator 500 unless a passcode is provided. In such embodiments only the interrogator 500 has authority to overwrite the address, but the unit 100 or a user may overwrite the address with the appropriate passcode. In still further embodiments of the unit 100 the RFID 400 is configured to receive a signal from the interrogator 500 that designates a memory address as write-protected against the recordation of any data, regardless of the source. In such embodiments the data is essentially permanent.

In embodiments of the unit 100 comprising a computing device 600, the computing device 600 may be configured to designate a memory address as write-protected against the recordation of any data not transmitted by the computing device 600. In some such embodiments, the computing device 600 is configured to designate a memory address as write-protected against the recordation of any data not transmitted by the computing device 600 unless a passcode is provided. In further embodiments of this type, the computing device 600 is configured to designate a memory address as write-protected against the recordation of any data.

Various types of information may be recorded on the unit 100 at the given memory address; of course, numerous pieces of information may be recorded at a plurality of memory addresses 310, any of which may be designated as write-only according to the rules above. For example, the unit 100 may comprise a unit identifier 810 recorded in read-only non-volatile memory 800. The unit identifier 810 may be a serial number, manufacture date, lot number, or a combination of these. Specific types of information that may be stored in non-volatile memory include: an activation key 830, the unit's 100 manufacture date, the unit's 100 test results, a repair date, a repair type, a current owner identifier, a past owner identifier, a shipping recipient identifier, a shipping date, a warrantee date, and a warrantee identifier; the RFID 400 may be configured to transmit this information in response to a signal from the interrogator 500.

An embodiment of the device is illustrated in FIG. 1. A main power source 200 ("power source" in FIG. 1) provides power to a computing device 600 termed the device controller. The device controller switches power on and off to the memory storage device 300, and is connected to read and write to the memory storage device 300. The memory storage device 300 in this embodiment is of the dual-port type, so that it may receive power from either the main power source 200 or the RFID 400. It may also be read or written by either the controller or the RFID 400. Using an interrogator 500 a user may read and write various types of information to and from the memory. The type of information that may be written or read depends on the user's level of access. In this exemplary embodiment, any user with an interrogator 500 may read data relating to usage, configuration, logs, and error codes. Higher levels of authorization are required to write the device's configuration data (such as calibration data, operating parameters, and configuration commands). New programs can be uploaded to the device by a user with a certain authorization level with an interrogator 500. Device function can be enabled or disabled by a user with another level of authorization. Authentication can be provided by passwords as is known in the art. A user may be authenticated to a certain authorization level simply by using an interrogator 500 that transmits a signal recognized by the RFID 400.

C. Process for Gathering Utility Usage Data

Processes are provided for gathering utility usage data that are robust against loss of the primary power source for an MIU 100. In a general embodiment the process comprises interrogating any of the RFID-enabled utility device interface units 100 described above.

In another general embodiment, the process comprises recording a measurement from a utility meter on a memory storage device 300 comprising non-volatile media while the memory storage device 300 is powered by a main power source 200; interrogating an RFID 400, the RFID 400 connected to the memory storage device 300 to read and transmit the measurement from the memory storage device 300 and to provide radiofrequency induction power to the memory storage device 300; wherein, if the main power source 200 is unavailable, said interrogation causes the RFID 400 to power the memory storage device 300 by radiofrequency induction, read the measurement from the memory storage device 300, and transmit the measurement to the interrogator 500.

The utility meter, memory storage device 300, main power source 200, and RFID 400 may be any that are disclosed as suitable for the MIU 100 described above.

The RFID 400 may be interrogated by any means known in the art. The nature of the interrogator 500 is not critical, so long as it functions to transmit a radiofrequency transmission that is recognized by the RFID 400. The interrogation signal will be at a frequency that matches the RFID 400; for example interrogation may comprise transmitting at a frequency of up to about 5.875 GHz; in another example interrogation may comprise transmitting at about 450-470 MHz. In some embodiments of the process the interrogator 500 will also have a radio receiver for receiving the return signal from the RFID 400. It is possible that the receiver that receives the return signal will not be part of the interrogator 500, although conventional interrogators incorporate both structures. In some embodiments of the method the interrogator 500 is a mobile interrogator 500, for example a man-portable interrogator 500 or a vehicle-mounted interrogator 500. One suitable form of a man-portable interrogator 500 is a handheld interrogator 500.

In some embodiments of the process the interrogation signal causes the RFID 400 to power the memory storage device 300 by radiofrequency induction only when the main power source 200 is unavailable. If the main power source 200 is available, then the memory storage device 300 will continue to rely on the main power source 200 even if interrogation occurs. In some embodiments, if the main power source 200 is available, the RFID 400 will not read the measurement and transmit the measurement in response to interrogation. Embodiments are contemplated in which the measurement will be read and transmitted in response to interrogation when the main power source 200 is available, but the memory storage device 300 will be powered by the main power source 200, not by radiofrequency induction as would occur if the main power source 200 were unavailable.

Some embodiments of the process comprise recording configuration data of the meter interface unit 100 on the memory storage device 300 while the memory storage device 300 is powered by the main power source 200; recording the difference between the measurement and a previous measurement on the memory storage device 300 while the memory storage device 300 is powered by the main power source 200; wherein the interrogation causes the RFID 400 to read the configuration data and difference from the memory storage device 300 and transmit the configuration data and difference to the interrogator 500 if the main power source 200 is unavailable. In further embodiments, only if the main power source 200 is unavailable will interrogation cause the RFID 400 to read the configuration data and difference from the memory storage device 300 and transmit the configuration data and difference to the interrogator 500. In such embodiments the MIU's 100 last configuration and the usage since the last measurement was recorded are stored in non-volatile memory. If main power fails, the MIU 100 can provide the usage as of the time of the most recent measurement and it can provide its last configuration; the configuration data make it simple to restore the MIU 100 to its last configuration state prior to primary power loss.

In some embodiments of the process the interrogation causes the RFID 400 to power the memory storage device 300 by radiofrequency induction only when the main power source 200 is unavailable. In such embodiments the memory storage device 300 continues to run on main power if the RFID 400 is interrogated while main power is available. In some embodiments of the process the interrogation causes the RFID 400 to read the measurement from the memory storage device 300, and transmit the measurement to the interrogator 500 only if the main power source 200 is unavailable. Embodiments are also contemplated in which, when main power is available, the memory storage device 300 continues to run on main power, and interrogation causes the RFID 400 to read the measurement from the memory storage device 300 and transmit the measurement to the interrogator 500.

In some embodiments of the process the interrogation causes the RFID 400 to power the memory storage device 300 by radiofrequency induction only when the main power source 200 is unavailable, and the interrogation causes the main power source 200 to power the memory storage device 300 if the main power source 200 is available.

Some embodiments of the process comprise recording a plurality of measurements from the utility meter on the memory storage device 300 while the memory storage device 300 is powered by the main power source 200, the plurality of measurements being recorded at regular time intervals. The regular time interval may be any that is suitable for gauging use. The time interval may coincide with a billing cycle, for example, monthly. Examples of the regular time interval include yearly, quarterly, monthly, weekly, daily, every 12 hours, every 4 hours, and hourly. The interval may be indicated by a clock that is part of the unit 100. An alternative embodiment of the process comprises recording a measurement from the utility meter on the memory storage device 300 at regular temporal intervals, regardless of the power source used for the memory storage device 300.

Some embodiments of the process comprise powering the memory storage device 300 from the main power source 200; reading the measurement from the memory storage device 300, and transmitting the measurement to a receiver if the main power source 200 is available. In such embodiments transmission may occur by way of a transmission system that is separate from the RFID 400; it may be significantly more powerful than the RFID 400 to facilitate transmissions to relatively distant receivers. This may be necessary for example, if the MIU 100 communicates with a fixed network. In a further embodiment of the process the measurement is transmitted to an automated meter reading system.

In addition to providing access to usage data when the main power source 200 is not available, some embodiments of the process can be used to provide useful information about the MIU 100 to users. For example, the MIU 100 can be used to store an activation key 830 that is needed to initialize the MIU 100 in an automatic utility meter reading system. In some embodiments the activation key 830 is recorded in non-volatile memory. In one exemplary embodiment, the process comprises recording an activation key 830 in non-volatile memory in the unit 100; and transmitting the activation key 830 from the meter interface unit 100 to an automatic utility meter reading system; wherein said transmitting of the activation key 830 causes the automatic utility meter reading system to recognize the meter interface unit 100.

The MIU 100 can also be used to store and transmit configuration data. For example, the process may comprise transmitting a signal to the RFID 400 prior to the initial activation of the meter interface unit 100, the signal comprising a configuration packet, wherein the signal causes the RFID 400 to power the memory storage device 300 by radiofrequency induction and record the configuration packet on the memory storage device 300. A further embodiment directed to this purpose further comprises and designates the memory addresses 310 when the configuration packet is stored as read-only. The configuration packet may then be read during installation or servicing of the meter using radiofrequency induction as the source of power.

In another exemplary embodiment, the RFID 400 is used to store and provide a unit identifier 810. This embodiment comprises recording a unit identifier 810 on a non-volatile read-only memory device in the unit 100, wherein interrogation causes the RFID 400 to power the memory storage device 300 by radiofrequency induction, read the unit identifier 810 from the memory storage device 300, and transmit the unit identifier 810 to the interrogator 500.

Other types of useful information can be recorded in the MIU 100, as well. Further embodiments may comprise recording a datum 820 in read-only non-volatile memory 800 in the unit 100, the datum 820 selected from the group consisting of: the unit's 100 manufacture date, the unit's 100 test results, a repair date, a repair type, a current owner identifier, a past owner identifier, a shipping recipient identifier, a shipping date, a warranty date, and a warranty identifier; wherein said interrogation causes the RFID 400 to read the datum 820 from the memory storage device 300, and transmit the measurement to the interrogator 500.

As described in the previous section, the memory storage device 300 may contain a memory address 310 (or more often a multiplicity of addresses 310) that is designated as read-only, at least under certain circumstances. Such embodiments allow certain data to be stored permanently in the MIU 100, or until a user or system with a certain authorization level overwrites it. "Authorization" in this context may occur if the user or system accesses the MIU 100 using an interrogator 500 (any party with an interrogator 500 is authorized). One exemplary embodiment, wherein the memory storage device 300 comprises a plurality of memory addresses 310, involves receiving a signal from the interrogator 500 that designates a memory address as write-protected. Alternatively, the process may comprise receiving a signal from the interrogator 500 that designates a memory address as write-protected against the recordation of any data not transmitted by an interrogator 500. In another exemplary embodiment the process comprises receiving a signal from the interrogator 500 that designates a memory address as write-protected against the recordation of any data not transmitted by an interrogator 500 unless a passcode is provided. In a still further embodiment the process comprises receiving a signal from the interrogator 500 that designates a memory address as write-protected against the recordation of any data.

D. Conclusions

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. §1.77 or otherwise to provide organizational queues. These headings shall not limit or characterize the invention(s) set forth herein.

We claim:

1. An RFID-enabled utility device interface unit configured to receive measurements from a utility meter, the meter interface unit comprising:
   (a) a main power source that is not a radiofrequency induction power source;

(b) a memory storage device comprising a plurality of memory addresses in non-volatile memory connected to receive power from the main power source, and configured to periodically record a measurement from the utility meter in the non-volatile memory when powered by the main power source; and (c) an RFID connected to the memory storage device to read the memory storage device and to provide radiofrequency induction power to the memory storage device, configured so as to provide the radiofrequency induction power to the memory storage device in response to a signal from an interrogator, configured to transmit the measurement that is recorded on the memory storage device in response to a signal from the interrogator, and wherein the RFID is configured to receive a signal from the interrogator that designates a memory address as write-protected against the recordation of any data not transmitted by an interrogator.

2. The unit of claim 1, wherein the RFID is configured to transmit data to the memory storage device.

3. The RFID-enabled meter interface unit of claim 1 comprising a computing device in control of the memory storage device.

4. The RFID-enabled meter interface unit of claim 1, wherein the RFID comprises a computing device.

5. The RFID-enabled meter interface unit of claim 1, wherein the RFID comprises the computing device, and wherein the computing device is an integrated circuit.

6. The RFID-enabled meter interface unit of claim 1, wherein the main power source is a battery.

7. The RFID-enabled meter interface unit of claim 1, wherein the utility meter is selected from the group consisting of: an electricity meter, a water meter, and a gas meter.

8. The RFID-enabled meter interface unit of claim 1, wherein the RFID comprises an antenna, the antenna having a resonant frequency of 450-470 MHz.

9. The RFID-enabled meter interface unit of claim 1, wherein the RFID is configured to receive a signal from the interrogator that designates a memory address as write-protected against the recordation of any data not transmitted by an interrogator unless a passcode is provided.

10. The RFID-enabled meter interface unit of claim 1 wherein the device controller is configured to designate a memory address as write-protected against the recordation of any data not transmitted by the computing device.

11. The RFID-enabled meter interface unit of claim 1 wherein the device controller is configured to designate a memory address as write-protected against the recordation of any data not transmitted by the computing device unless a passcode is provided.

12. The RFID-enabled meter interface unit of claim 1 wherein the device controller is configured to designate a memory address as write-protected against the recordation of any data.

13. The RFID-enabled meter interface unit of claim 1 comprising a unit identifier recorded in read-only non-volatile memory.

14. The RFID-enabled meter interface unit of claim 1 comprising a datum recorded in read-only non-volatile memory, the datum selected from the group consisting of:
the unit's manufacture date, the unit's test results, a repair date, a repair type, a current owner identifier, a past owner identifier, a shipping recipient identifier, shipping date, a warrantee date, and a warrantee identifier; wherein the RFID is configured to transmit the datum in response to a signal from the interrogator.

15. The RFID-enabled meter interface unit of claim 1 comprising an activation key in non-volatile memory.

16. A process for gathering utility usage data from RFID-enabled meter interface unit, the process comprising interrogating the device of claim 1.

17. A process for gathering utility usage data from an RFID-enabled meter interface unit, the process comprising:

(a) recording a measurement from a utility meter on a memory storage device comprising non-volatile media while the memory storage device is powered by a main power source that is not radiofrequency induction, wherein the memory storage device comprises a plurality of memory addresses;

(b) interrogating an RFID, the RFID connected to the memory storage device to reading and transmit the measurement from the memory storage device and to provide radiofrequency induction power to the memory storage device; and (c) receiving a signal from the interrogator that designates a memory address as write-protected against the recordation of any data not transmitted by an interrogator wherein, if the main power source is unavailable, said interrogation causes the RFID to power the memory storage device by radiofrequency induction, read the measurement from the memory storage device, and transmit the measurement to the interrogator.

18. The process of claim 17, wherein said interrogation causes the RFID to power the memory storage device by radiofrequency induction only when the main power source is unavailable.

19. The process of claim 17, comprising:

(a) recording configuration data of the meter interface unit on the memory storage device while the memory storage device is powered by the main power source;

(b) recording the difference between the measurement and a previous measurement on the memory storage device while the memory storage device is powered by the main power source; and wherein said interrogation causes the RFID to read the configuration data and difference from the memory storage device and transmit the configuration data and difference to the interrogator if the main power source is unavailable.

20. The process of claim 17, comprising recording a plurality of measurements from the utility meter on the memory storage device while the memory storage device is powered by the main power source, the plurality of measurements being recorded at regular time intervals.

21. The process of claim 17 comprising: powering the memory storage device from the main power source; reading the measurement from the memory storage device, and transmitting the measurement to a receiver if the main power source is available.

22. The process of claim 17 comprising: powering the memory storage device from the main power source; reading the measurement from the memory storage device, and transmitting the measurement to an automated meter reading system if the main power source is available.

23. The process of claim 17, wherein said interrogation causes the RFID to power the memory storage device by radiofrequency induction only when the main power source is unavailable, and wherein said interrogation causes the main power source to power the memory storage device only when the main power source is available.

24. The process of claim 17, comprising recording a unit identifier on a non-volatile read-only memory device in the unit, wherein interrogation causes the RFID to power the memory storage device by radiofrequency induction, read the unit identifier from the memory storage device, and transmit the unit identifier to the interrogator.

25. The process of claim 17, comprising:
   (a) recording an activation key in non-volatile memory in the unit; and
   (b) transmitting the activation key from the meter interface unit to an automatic utility meter reading system;
   wherein said transmitting of the activation key causes the automatic utility meter reading system to recognize the meter interface unit.

26. The process of claim 17, wherein the main power source is a battery.

27. The process of claim 17, comprising recording a measurement from the utility meter on the memory storage device at regular temporal intervals.

28. The process of claim 17, comprising recording a measurement from the utility meter on the memory storage device at regular temporal intervals as indicated by a clock in the unit.

29. The process of claim 17, wherein the utility meter is selected from the group consisting of an electricity meter, a water meter, and a gas meter.

30. The process of claim 17, wherein the interrogation comprises transmitting at a frequency of 450-470 MHz.

31. The process of claim 17, wherein the process comprises receiving a signal from the interrogator that designates a memory address as write-protected against the recordation of any data not transmitted by an interrogator unless a passcode is provided.

32. The process of claim 17 comprising: recording a datum in read-only non-volatile memory in the unit, the datum selected from the group consisting of: the unit's manufacture date, the unit's test results, a repair date, a repair type, a current owner identifier, a past owner identifier, a shipping recipient identifier, shipping date, a warrantee date, and a warrantee identifier; wherein said interrogation causes the RFID to read the datum from the memory storage device, and transmit the measurement to the interrogator.

33. The process of claim 17, comprising recording an activation key in non-volatile memory.

34. The process of claim 17, comprising transmitting a signal to the RFID prior to the initial activation of the meter interface unit, the signal comprising a configuration packet, wherein the signal causes the RFID to power the memory storage device by radiofrequency induction and record the configuration packet on the memory storage device.

35. The process of claim 17, comprising:
   (a) transmitting a signal to the RFID prior to the initial activation of the meter interface unit, the signal comprising a configuration packet, wherein the signal causes the RFID to power the memory storage device by radiofrequency induction and record the configuration packet at a memory address in the memory storage device; and
   (b) designating the memory address as read-only.

* * * * *